US008424675B2

(12) United States Patent
Rau

(10) Patent No.: US 8,424,675 B2
(45) Date of Patent: Apr. 23, 2013

(54) CONVEYOR BELT WITH WEAR-TOLERANT STACKED ROLLERS

(75) Inventor: Brien G Rau, Jefferson, LA (US)

(73) Assignee: Laitram, L.L.C., Harahan, LA (US)

( * ) Notice: Subject to any disclaimer, the term of this patent is extended or adjusted under 35 U.S.C. 154(b) by 391 days.

(21) Appl. No.: 12/816,066

(22) Filed: Jun. 15, 2010

(65) Prior Publication Data

US 2011/0303512 A1 Dec. 15, 2011

(51) Int. Cl.
*B65G 17/24* (2006.01)

(52) U.S. Cl.
USPC .......... 198/779

(58) Field of Classification Search .......... 198/779, 198/370.09, 370.1, 371.3, 782, 789
See application file for complete search history.

(56) References Cited

U.S. PATENT DOCUMENTS

| | | | | |
|---|---|---|---|---|
| 3,653,489 | A | 4/1972 | Tullis et al. | |
| 3,675,760 | A | 7/1972 | Burrage et al. | |
| 3,894,627 | A | 7/1975 | Jabbusch et al. | |
| 4,262,794 | A | 4/1981 | Bourgeois | |
| 4,293,064 | A | 10/1981 | Robinson | |
| 5,038,921 | A | 8/1991 | Hoppmann et al. | |
| 5,190,137 | A | 3/1993 | Tas | |
| 5,238,099 | A | 8/1993 | Schroeder et al. | |
| 6,318,544 | B1 | 11/2001 | O'Connor et al. | |
| 6,494,312 | B2 | 12/2002 | Costanzo | |
| 6,571,937 | B1 | 6/2003 | Costanzo et al. | |
| 7,040,480 | B2 | 5/2006 | Sedlacek | |
| 7,344,018 | B2 * | 3/2008 | Costanzo et al. | 198/779 |
| 7,357,246 | B2 | 4/2008 | Costanzo | |
| 7,360,641 | B1 * | 4/2008 | Fourney | 198/779 |
| 7,588,137 | B2 * | 9/2009 | Fourney | 198/779 |

FOREIGN PATENT DOCUMENTS

| | | | |
|---|---|---|---|
| GR | GB2278329 | A | 11/1994 |
| JP | 60252509 | A | 12/1985 |
| JP | H2-7218 | A | 1/1990 |
| JP | 03-88617 | A | 4/1991 |
| JP | 08-277029 | A | 10/1996 |

OTHER PUBLICATIONS

PCT/US11/37203, International Preliminary Report on Patentability and Written Opinion of the International Searching Authority, mailed Jan. 3, 2013, European Patent Office, Rijswijk, NL.

* cited by examiner

*Primary Examiner* — Gene Crawford
*Assistant Examiner* — William R Harp
(74) *Attorney, Agent, or Firm* — James T. Cronvich

(57) ABSTRACT

A conveyor belt having multiple roller sets, each roller set including a first roller and a second roller, the first roller being movable into contact with the second roller so that driving of one of the rollers in a first angular direction causes rotation of the other roller in a second, opposite angular direction.

18 Claims, 9 Drawing Sheets

CONVEYOR BELT WITH WEAR-TOLERANT STACKED ROLLERS

BACKGROUND

Conveyor belts sometimes include fixed, stacked rollers that are used to propel objects rearward along the conveyor belt as it advances. The roller at the bottom of the stack rolls on a bearing surface underlying the conveyor belt as the conveyor belt advances along a conveyor. The forward rotation of the rolling bottom roller contacting the top roller in the stack causes the top roller to rotate in the opposite direction to propel objects conveyed atop the rollers to be pushed rearward on the conveyor belt. As the top and bottom rollers wear, contact between the bottom rollers and the top rollers deteriorates.

BRIEF DESCRIPTION OF THE DRAWINGS

The disclosed conveyor belts and conveyors can be understood with reference to the following drawings. The components in the drawings are not necessarily to scale.

DETAILED DESCRIPTION

Described in the following are conveyor belts having rollers that can be used to displace objects conveyed by the belts. In some embodiments, a conveyor belt comprises roller sets including top and bottom rollers, with the bottom roller extending below a bottom surface of the belt and the top roller extending above a top surface of the belt. The top and bottom rollers contact each other such that when the bottom roller is driven in a first angular direction, the top roller rotates in a second, opposite angular direction. In cases in which the rollers rotate in a direction that forms an angle with a longitudinal direction of the belt, the top rollers can be used to displace objects in a transverse and rearward direction such that objects can be diverted with relatively high diverting angles. In cases in which the rollers rotate in a direction parallel to the longitudinal direction of the belt, objects can be displaced on the belt in a direction opposite the direction of belt travel.

In the following, various embodiments of conveyor belts are disclosed. Although specific embodiments are presented, those embodiments are mere example implementations of the disclosed belts and it is noted that other embodiments are possible. All such embodiments are intended to fall within the scope of this disclosure.

Figure 1:
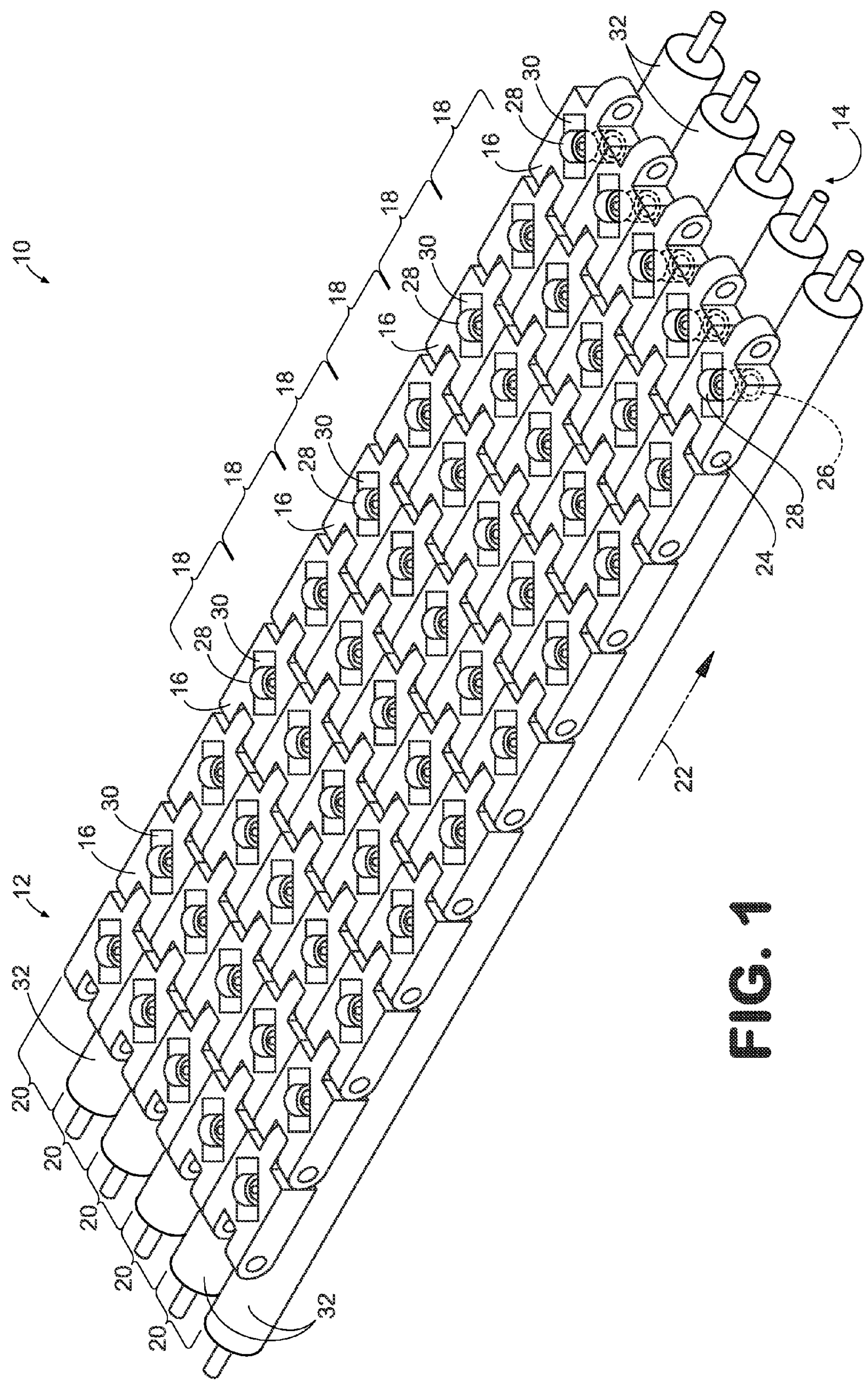
FIG. 1 is a top perspective view of a first embodiment of a portion of a conveyor.

Referring to the figures, in which like numerals indicate corresponding parts throughout the several views, FIG. 1 illustrates an embodiment of a conveyor 10 that can be used to divert objects. As indicated in FIG. 1, the conveyor 10 comprises a conveyor belt 12 and a drive mechanism 14 with which the belt can interact. In the embodiment of FIG. 1, the conveyor belt 12 comprises a plurality of conveyor belt modules 16 that are linked together to form the belt. The modules 16 are aligned in transverse rows 18 that extend across a width of the belt 12, and in longitudinal columns 20 that extend along a longitudinal direction of the belt, which coincides with the direction of belt travel indicated by arrow 22. By way of example, the modules 16 are pivotally connected to adjacent modules along the longitudinal direction of the belt 12 with transverse shafts 24. The modules 16 include roller sets that comprise a first or bottom roller 26 and second or top roller 28 that are arranged in a vertically-stacked orientation within an inner space 30 of the modules.

Figure 7:
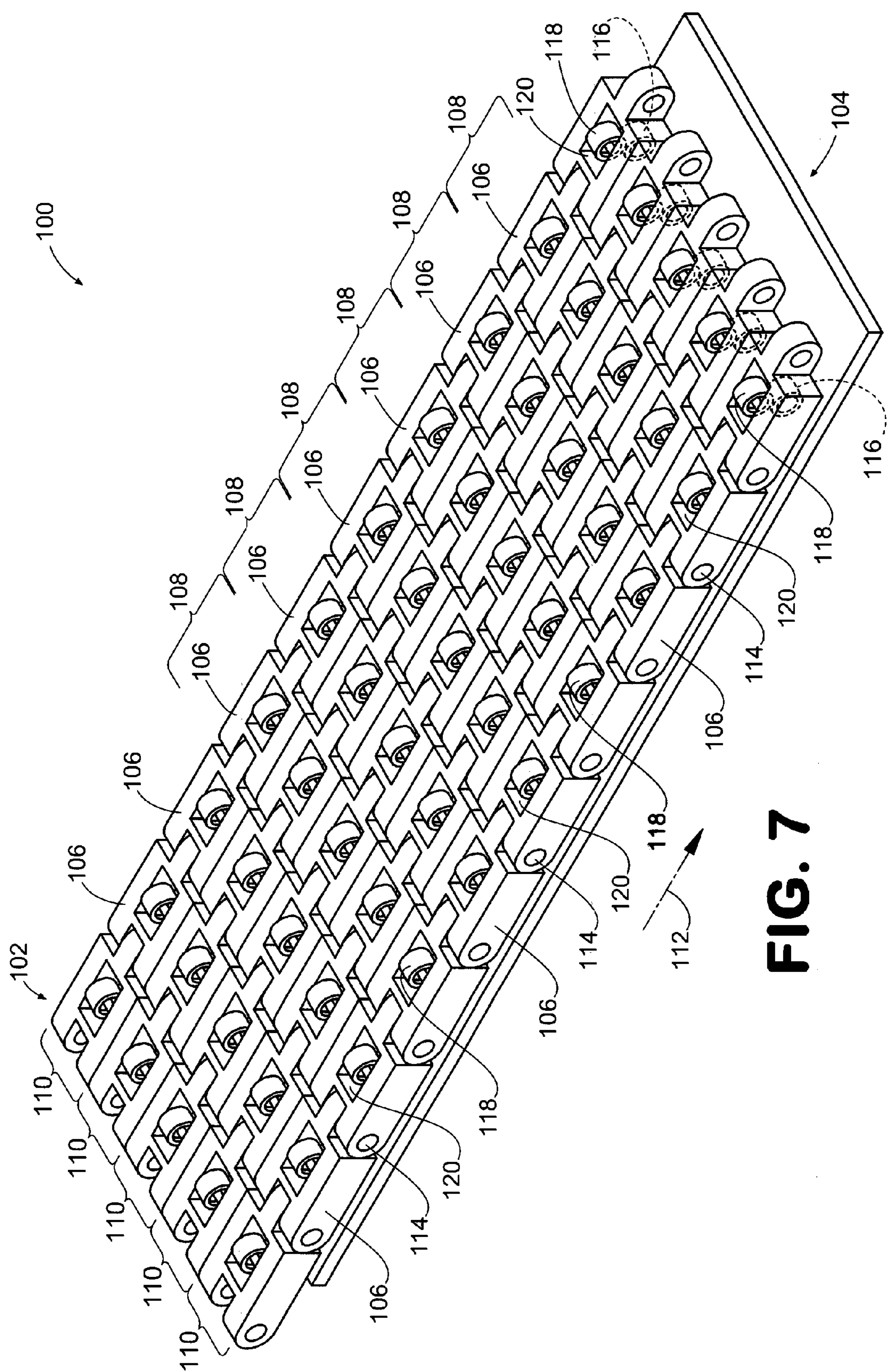
FIG. 7 is a top perspective view of a second embodiment of a portion of a conveyor.

The drive mechanism 14 is used to drive the bottom and top rollers 26, 28 of the conveyor belt modules 16. As indicated in FIG. 1, the drive mechanism 14 can comprise multiple longitudinal rollers 32 having axes of rotation that are parallel to the longitudinal direction of the conveyor belt 12 and that align with the columns 20 of conveyor belt modules 16 such that one longitudinal roller is provided for each belt column. As described in greater detail below, when the longitudinal rollers 32 are placed in contact with the bottom rollers 26 while the belt 12 is moving, frictional forces between the longitudinal rollers and the bottom rollers cause the bottom rollers to rotate, which results in opposite rotation of the top rollers 28. In at least some embodiments, the longitudinal rollers 32 have high-friction outer surfaces that reduce slip between the longitudinal rollers 32 and the bottom rollers 26. In alternative embodiments, the drive mechanism can comprise a friction plate that is used to rotate the bottom rollers 26. An example of such a friction plate is illustrated in FIG. 7.

Figure 2:
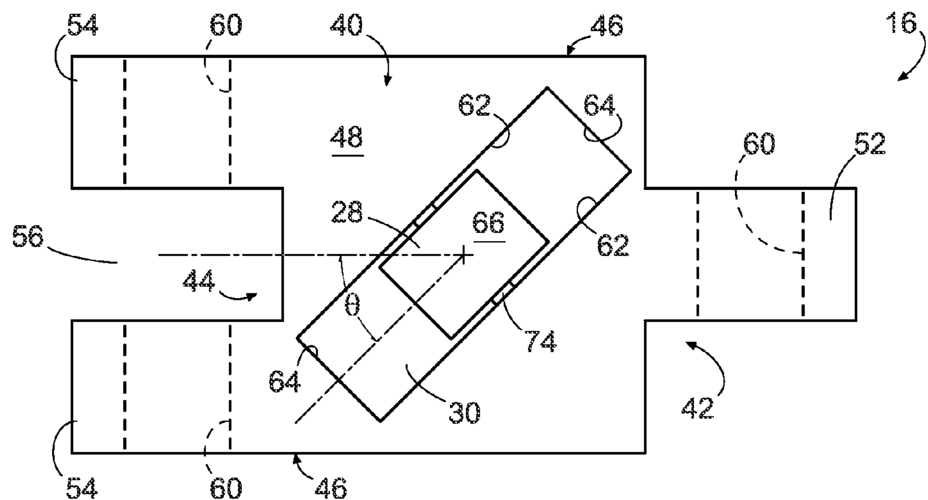
FIG. 2 is top view of an embodiment of a conveyor belt module used in the conveyor of FIG. 1.
Figure 3:
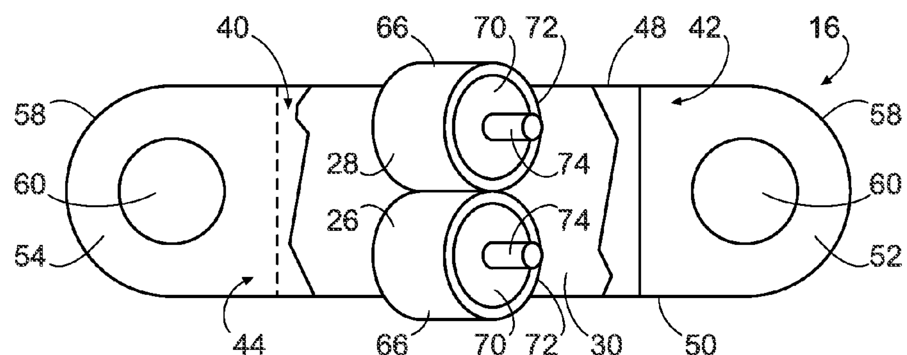
FIG. 3 is a side view of the conveyor belt module of FIG. 2.

FIGS. 2 and 3 illustrate an example embodiment for the conveyor belt module 16. As indicated in those figures, the module 16 comprises a body 40 having a front end 42, a rear end 44, and opposed lateral sides 46. Furthermore, the body 40 includes a top surface 48 and a bottom surface 50. Although particular spatial terminology such as “front” and “rear” have been used, those terms are used herein to describe the module 16 in its orientation shown in FIG. 1. Therefore, the spatial terms are not absolute and should not be interpreted as such.

In some embodiments, the module body 40 is unitarily constructed from a single piece of material, such as a polymeric material. In other embodiments, the body 40 comprises separate pieces, for example separate halves, that are connected together to form an integrated body. In such embodiments, the body 40 can be formed from a polymeric and/or metal material.

As shown most clearly in FIG. 2, the conveyor belt module 16 further includes connection portions that extend from body 40. In the embodiment of FIGS. 2 and 3, the module 16 comprises a single connection portion 52 that extends from the front end 42 of the body 40 and two connection portions 54 that extend from the rear end 44 of the body separated by a gap 56. With such a configuration, the modules 16 are adapted for linking to each other along the longitudinal direction of the belt. Specifically, the connection portion 52 of one module 16 can be received in the gap 56 of an adjacent module, the connection portion 52 of that adjacent module 16 can be received by the gap 56 of the next adjacent module 16, and so forth, as indicated in FIG. 1. As shown most clearly in FIG. 3, each of the connection portions 52, 54 includes a rounded outer surface 58 and a transverse opening 60 that is adapted to receive a transverse shaft, such as shaft 24 shown in FIG. 1. When the diameter of the transverse shaft is smaller than the openings 60, the modules 16 can pivotally rotate relative to the shaft and vice versa.

The module body 40 further defines the inner space 30 first identified in relation to FIG. 1. As indicated in FIG. 2, the inner space 30 can, in some embodiments, comprise a generally rectangular cross-section, when viewed from the top or bottom, defined by opposed side walls 62 and opposed end walls 64. As further indicated in FIG. 2, the side walls 62 are arranged at an angle relative to the lateral sides 46 of the module body 40, and therefore relative to a longitudinal axis of the module 16.

As is apparent from FIGS. 2 and 3, the bottom and top rollers 26, 28 are at least partially contained within the inner space 30 defined by the module body 40. As indicated in FIG. 3, outer surfaces 66 of the rollers 26, 28 contact each other such that rotation of one roller in a first direction causes opposite rotation of the other roller. A portion of the bottom roller 26 extends below the bottom surface 50 of the body 40 and a portion of the top roller 28 extends above the top surface 48 of the body. With such a configuration, the drive mechanism described in relation to FIG. 1 can contact the bottom roller 26 to cause it to rotate, and objects supported by the conveyor belt in which the module 16 is used can be displaced by the top roller 28.

Each roller can comprise a roller body 70 constructed of a polymeric or metal material that provides structure to the roller, and an outer layer 72 that is provided about an outer surface of the roller body and that forms the outer surface 66. In some embodiments, the outer layer 72 of each roller 26, 28 is composed of a high-friction material that reduces slip with mechanisms and/or objects it contacts. In other embodiments, only the outer layer 72 of the bottom roller 26 is a high-friction material so as to enable desired slipping between the top roller 28 and the objects it supports. As illustrated in both FIGS. 2 and 3, each roller 26, 28 is mounted within the inner space 30 on a roller shaft 74 that is supported by the module body 40. In some embodiments, the shafts 74 are supported by openings (not shown) formed in the body 40. In other embodiments, the shafts 74 are supported by brackets (not shown) provided within the inner space 30. Regardless, the shafts 74 are supported such that their associated rollers 26, 28 are placed in firm contact with each other to ensure that rotation of one roller (e.g., the bottom roller) will cause opposite rotation of the other roller (e.g., the top roller).

As further illustrated in FIGS. 2 and 3, the shafts 74, and therefore their associated rollers 26, 28, are supported at an angle θ, relative to a longitudinal axis of the module 16 and the conveyor belt in which it is used. In some embodiments, the angle θ can be any angle from about 1°, in which case the shaft 74 is nearly perpendicular to the longitudinal axis of the module 16, to about 89°, in which case the shaft is nearly parallel to the longitudinal axis of the module. As described in greater detail below, the angle that is selected affects the speed with which objects are diverted from the conveyor belt.

Figure 4:
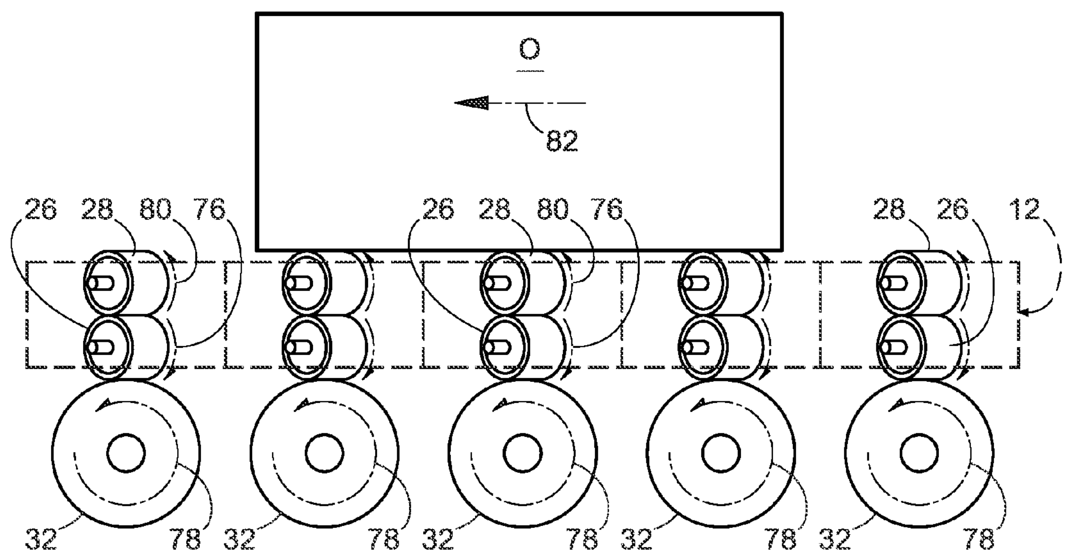
FIG. 4 is schematic end view of the conveyor of FIG. 1, illustrating diverting of an object conveyed by the conveyor.
Figure 5:
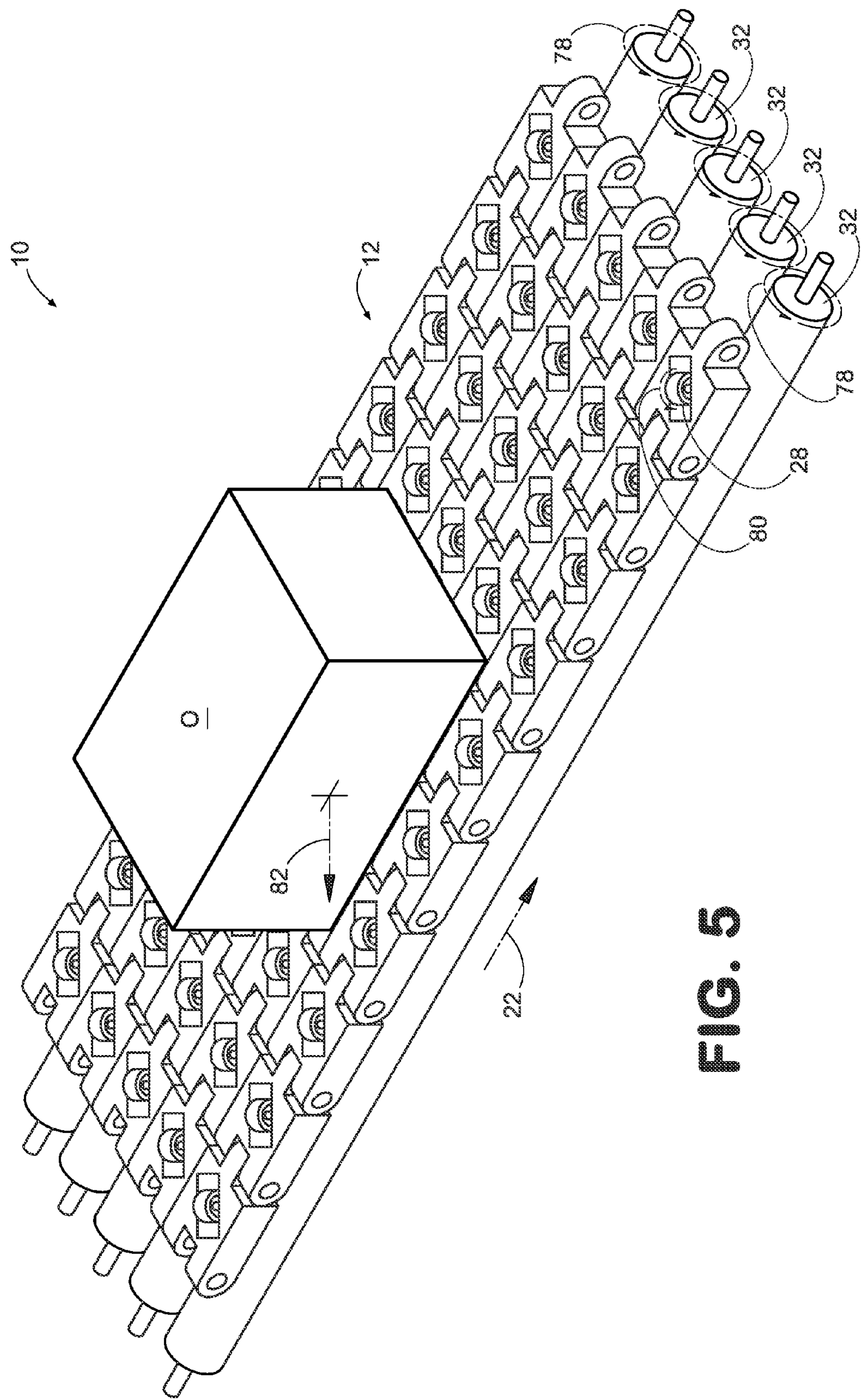
FIG. 5 is a top perspective view of the conveyor of FIG. 1, further illustrating diverting of the object by the conveyor.

FIGS. 4 and 5 illustrate diverting an object O using the conveyor 10. As indicated in FIG. 5, the conveyor belt 12 travels along the longitudinal rollers 32 in the direction of arrow 22. As indicated in FIG. 4, contact between the bottom rollers 26 and the longitudinal rollers 32 causes the bottom rollers to rotate in a downstream direction indicated by arrows 76. In addition, that contact causes the longitudinal rollers 32 to rotate in a counterclockwise direction (when viewed from a downstream position) as indicated by arrows 78. Rotation of the bottom rollers 26 causes the top rollers 28 to rotate in an opposite, upstream direction, indicated by arrows 80. As shown most clearly in FIG. 5, the rotation of the top rollers 28 displaces the object O in a transverse and rearward direction indicated by arrow 82. As used in the previous sentence, the term "rearward direction" is a relative term that indicates that the object O is displaced in a rearward direction relative to the conveyor belt 12. Since the belt 12 is travelling in the direction of arrow 22, however, the object O may not actually travel rearwardly in an absolute sense. Instead, assuming no slip between the bottom rollers 26 and the longitudinal rollers 32 and further assuming no slip between the top rollers 28 and the object O, the longitudinal position of the object will substantially not change because of the cancellation of its downstream movement by its upstream movement. In such a case, the object O is only transversely displaced by the conveyor 10.

The transverse diverting described above in relation to FIGS. 4 and 5 is illustrated in FIGS. 6A-6D. In those figures, the conveyor belt 12 travels from top to bottom as indicated by arrow 22. Positioned to one side of the conveyor belt 12 is an outfeed conveyor 84. In some embodiments, the outfeed conveyor 84 comprises its own driven conveyor belt so as to be adapted to convey a diverted object in a direction other than that in which the conveyor belt 12 travels. In other embodiments, the outfeed conveyor 84 comprises a non-driven conveyor that, for example, comprises a plurality of free-spinning wheels along which the object can travel, for instance under the force of gravity. Regardless, the outfeed conveyor 84 is adapted to receive objects diverted by the conveyor belt 12.

Figure 6A:
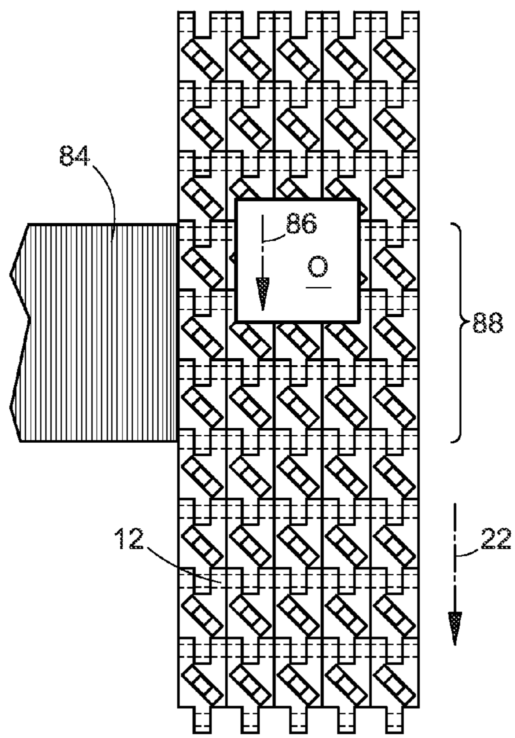
FIGS. 6A-6D are schematic views sequentially illustrating diverting of an object using the conveyor of FIG. 1.
Figure 6B:
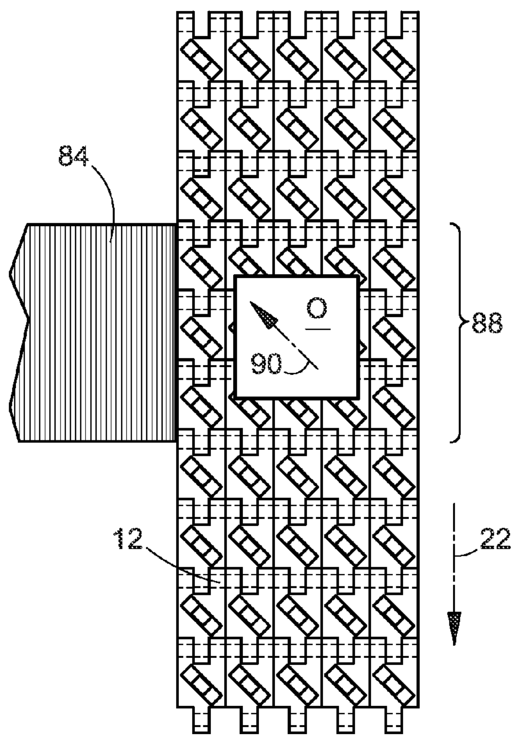
Figure 6C:
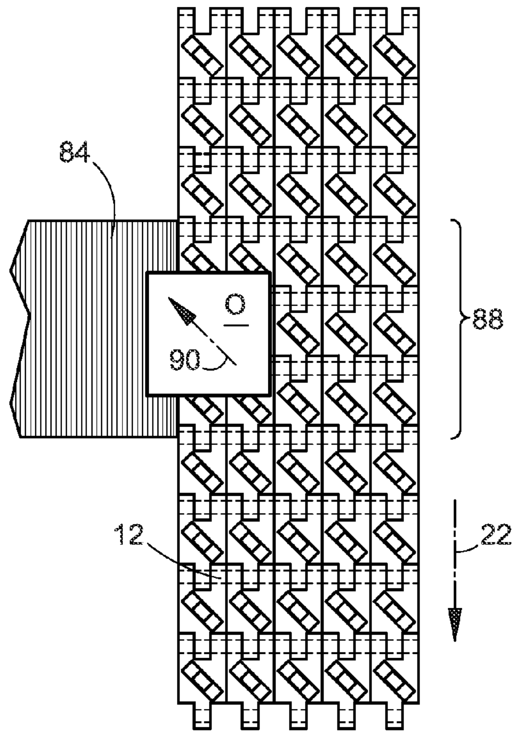
Figure 6D:
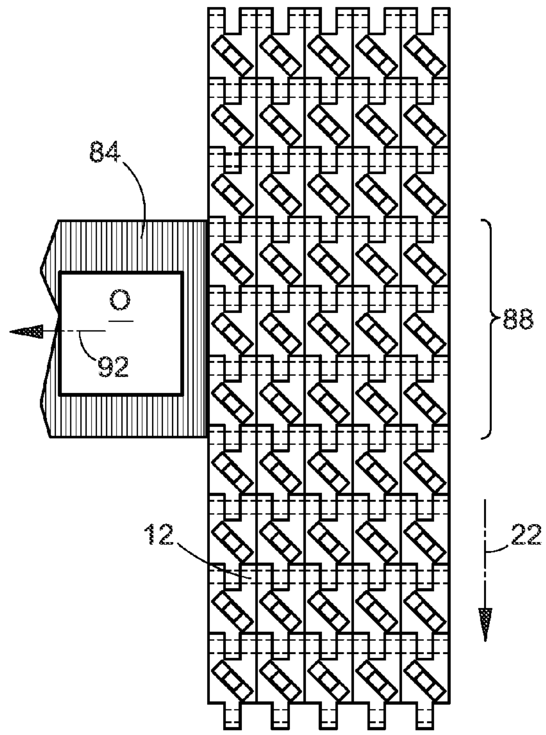

As indicated in FIG. 6A, an object O travels along the conveyor belt 12 in the direction indicated by arrow 86 and approaches a diverting area 88. Turning to FIG. 6B, once the object O enters the diverting area 88, the object is acted upon by the top rollers 28. In some embodiments, the top rollers 28 are activated in the diverting area 88 by a drive mechanism (not shown) that contacts the bottom rollers 26 of the belt only in the diverting area. In such cases, the bottom rollers 26, and the top rollers 28, will begin to rotate upon entering the diverting area 88. As indicated in FIG. 6B, rotation of the top rollers 28 causes the object O to be displaced in a transverse and rearward direction indicated by arrow 90. As described above, the rearward travel of the object O relative to the belt 12 may be substantially equivalent to forward travel of the object due to movement of the belt. In such cases, the object O does not significantly move forward or rearward in an absolute sense. Accordingly, as indicated in FIG. 6C, the object O is primarily displaced in the transverse direction toward the conveyor 84. In other words, the object O is diverted from the conveyor belt 12 at a diverting angle of approximately 90°. Notably, such a diverting angle is substantially larger than that achievable with other conveyor belts that comprise single rollers that are not provided in a stacked configuration. Continuing on to FIG. 6D, the object O is shown completely diverted from the conveyor belt 12, at which point the object may be carried away by the conveyor 84 in the direction indicated by arrow 92.

The substantially 90° diverting action described above occurs for any angle θ, selected from 1° to 89° (see FIG. 2). Therefore, objects will be diverted from the conveyor belt 12 at an angle of approximately 90° regardless of the angle of the top rollers 28 that is selected, assuming no slip and no gearing effect (described below). The selected angle, however, affects the speed with which the objects will be diverted. Specifically, the larger the angle θ, the faster the object will be diverted. Notably, when the top rollers 28 are positioned at a 45° angle relative to the longitudinal direction of the belt, the objects will be diverted from the belt at a speed approximately equal to the speed of belt travel, again assuming no slip and no gearing effect.

FIG. 7 illustrates an embodiment of a conveyor 100 that can be used to control the positioning of conveyed objects. As indicated in FIG. 7, the conveyor 100 comprises a conveyor belt 102 and a drive mechanism 104 with which the belt can interact. In the embodiment of FIG. 7, the conveyor belt 102 comprises a plurality of conveyor belt modules 106 that are linked together to form the belt. The modules 106 are aligned in transverse rows 108 that extend across a width of the belt 102, and in longitudinal columns 110 that extend along a longitudinal direction of the belt, which coincides with the direction of belt travel indicated by arrow 112. By way of example, the modules 106 are pivotally connected to adjacent modules along the longitudinal direction of the belt 102 with transverse shafts 114. Like the modules 16 shown in FIG. 1, the modules 106 include roller sets that comprise a first or bottom roller 116 and second or top roller 118 that are arranged in a vertically-stacked configuration within an inner space 120 of the modules.

The drive mechanism 104 is used to drive the bottom and top rollers 116, 118 of the conveyor belt modules 106. As indicated in FIG. 7, the drive mechanism 104 can comprise a friction plate that is used to rotate the bottom rollers 116. In at least some embodiments, the friction plate has a high-friction top surface that reduces slip between the plate and the bottom rollers 116.

Figure 8:
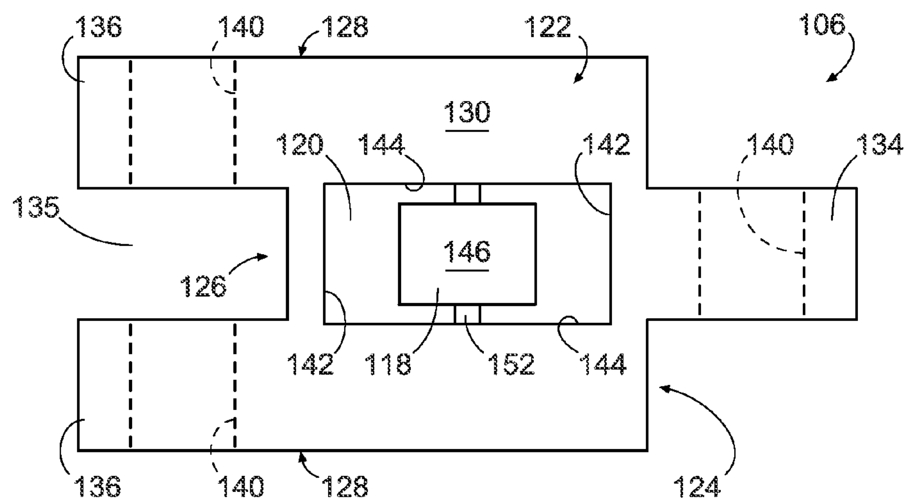
FIG. 8 is a top view of an embodiment of a conveyor belt module used in the conveyor of FIG. 7.
Figure 9:
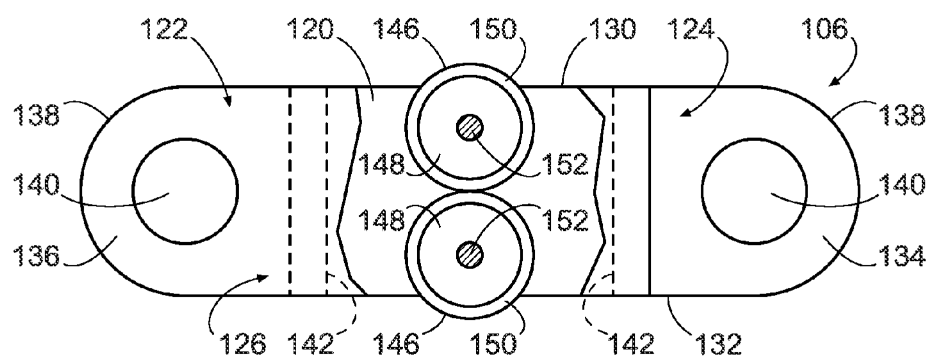
FIG. 9 is side view of the conveyor belt module of FIG. 8.

FIGS. 8 and 9 illustrate an example embodiment for the conveyor belt module 106. The module 106 is similar in many ways to the module 16 illustrated in FIGS. 2 and 3. Therefore, as indicated in FIGS. 8 and 9, the module 106 comprises a body 122 having a front end 124, a rear end 126, and opposed lateral sides 128. Furthermore, the body 122 includes a top surface 130 and a bottom surface 132. Again, the spatial terminology is used to reflect the orientation of the module 106 indicated in FIG. 7 and is not intended to be absolute.

As shown most clearly in FIG. 8, the conveyor belt module 106 further includes connection portions that extend from body 122. In the embodiment of FIGS. 8 and 9, the module 106 comprises a single connection portion 134 that extends from the front end 124 of the body 122 and two connection portions 136 that extend from the rear end 126 of the body separated by a gap 135. As shown most clearly in FIG. 3, each of the connection portions 134, 136 includes a rounded outer surface 138 and a transverse opening 140 that is adapted to receive a transverse shaft, such as shaft 114 shown in FIG. 7. When the diameter of the transverse shaft is smaller than the openings 140, the modules 106 can pivotally rotate relative to the shaft and vice versa.

The module body 122 further defines the inner space 120 first identified in relation to FIG. 7. As indicated in FIG. 8, the inner space 120 can, in some embodiments, comprise a generally rectangular cross-section, when viewed from the top or bottom, defined by opposed side walls 142 and opposed end walls 144. As further indicated in FIG. 8, the side walls 142 of the modules 106 are generally parallel to the lateral sides 128 of the module body 122 and, therefore, are generally parallel to a longitudinal axis of the module. As is apparent from FIGS. 8 and 9, the bottom and top rollers 116, 118 are at least partially contained within the inner space 120 defined by the module body 122. As indicated in FIG. 9, outer surfaces 146 of the rollers 116, 118 contact each other such that rotation of one roller in a first direction causes opposite rotation of the other roller. A portion of the bottom roller 116 extends below the bottom surface 132 of the body 122 and a portion of the top roller 118 extends above the top surface 130 of the body. With such a configuration, the drive mechanism described in relation to FIG. 7 can contact the bottom roller 116 to cause it to rotate, and objects supported by the conveyor belt in which the module 116 is used can be displaced by the top roller 118.

Each roller 116, 118 can comprise a roller body 148 constructed of a polymeric or metal material that provides structure to the roller, and an outer layer 150 that is provided about an outer surface of the roller body and that forms the outer surface 146. In some embodiments, the outer layer 150 of each roller 116, 118 is composed of a high-friction material that reduces slip with mechanisms and/or objects it contacts.

As illustrated in both FIGS. 8 and 9, each roller 116, 118 is mounted within the inner space 120 on a roller shaft 152 that is supported by the module body 122. In some embodiments, the shafts 152 are supported by openings (not shown) formed in the body 122. In other embodiments, the shafts 152 are supported by brackets (not shown) provided within the inner space 120. Regardless, the shafts 152 are supported such that their associated rollers 116, 118 are placed in firm contact with each other to ensure that rotation of one roller (e.g., the bottom roller) will cause opposite rotation of the other roller (e.g., the top roller). As further illustrated in both FIGS. 8 and 9, the shafts 152 are oriented so as to be substantially perpendicular to the longitudinal axis of the module 106 and the conveyor belt in which it is used.

Figure 10:
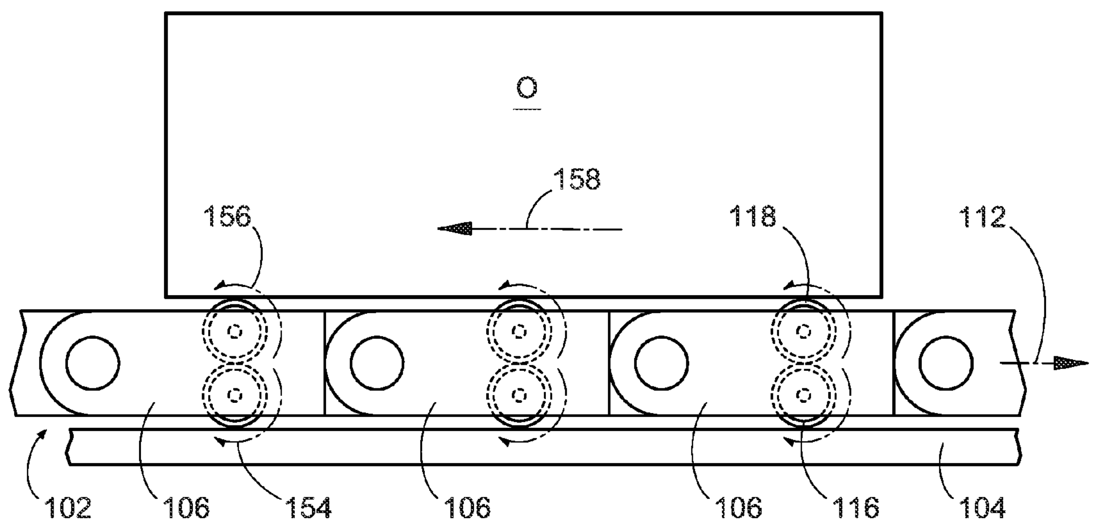
FIG. 10 is a side view of the conveyor of FIG. 7, illustrating displacing of an object conveyed by the conveyor.
Figure 11:
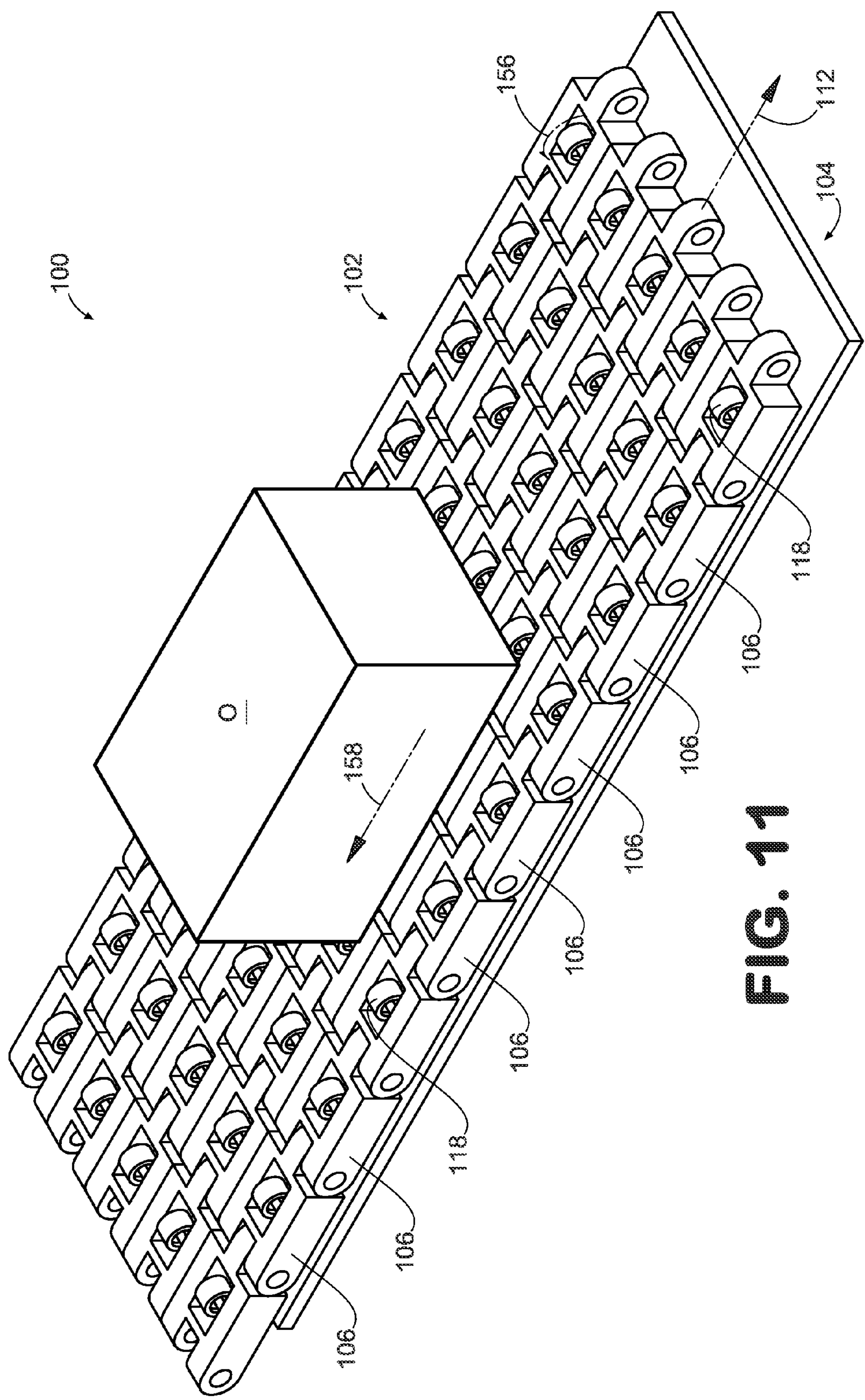
FIG. 11 is a top perspective view of the conveyor of FIG. 7, further illustrating displacing of the object by the conveyor.

FIGS. 10 and 11 illustrate displacement an object O on the conveyor 100. As indicated in FIG. 11, conveyor belt 102 travels along the drive mechanism 104 in the direction of arrow 112. As indicated in FIG. 10, contact between the bottom rollers 116 and the drive mechanism 104 causes the bottom rollers to rotate in a downstream direction indicated by arrows 154. Rotation of the bottom rollers 116 causes the top rollers 118 to rotate in an opposite, upstream direction, indicated by arrows 156. As shown in both FIGS. 10 and 11, the rotation of the top rollers 118 displaces the object O in a rearward direction relative to the belt 102 indicated by arrow 158. Assuming no slip between the bottom rollers 116 and the drive mechanism 114 and further assuming no slip between the top rollers 118 and the object O, the absolute position of the object will substantially not change because of the cancellation of its downstream movement by its upstream movement. In such a case, the object O will be held in place in an absolute sense. With such functionality, the transport of objects provided on the belt 102 can be selectively stopped by engaging the drive mechanism 104 with the bottom rollers 116 of the belt at a location at which the object is to be halted.

Figure 12:
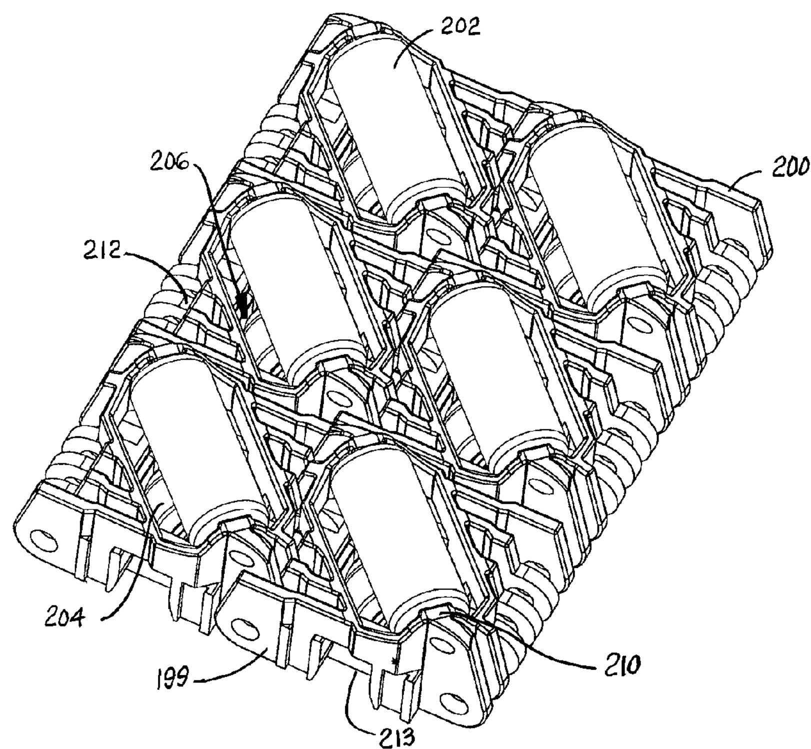
FIG. 12 is an oblique view of two rows of an embodiment of a conveyor belt having a floating bottom roller.
Figure 13:
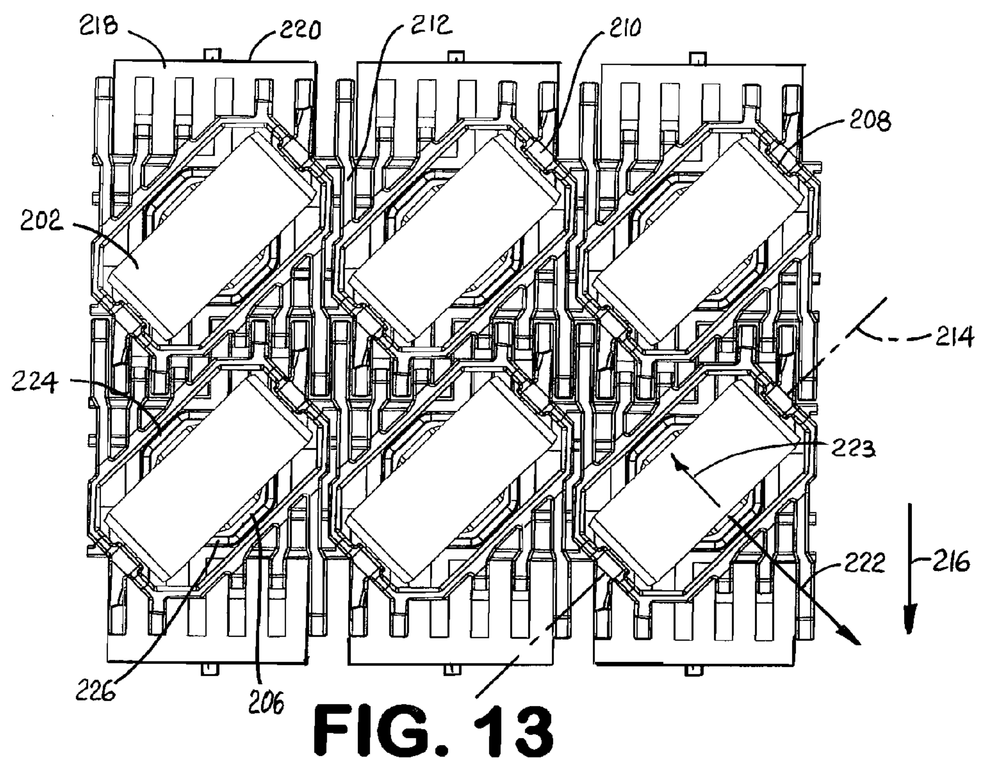
FIG. 13 is a top plan view of the conveyor belt of FIG. 12.

FIGS. 12 and 13 depict two rows of belt modules 199 in a modular conveyor belt 200 having roller sets comprising a top roller 202 and a bottom roller 204, in which the bottom roller floats in a cavity 206 within the belt. The top roller 202 is mounted for rotation on an axle 208 whose ends are fixedly supported in stanchions 210 upstanding from a top side 212 of the conveyor belt. As shown in this example, the axles define axes of rotation 214 oblique to the direction of travel 216 of the conveyor belt. The bottom rollers 204 are shorter than the top rollers and reside in the cavities 206 and rotate on axes of rotation parallel to the axes of rotation 214 of the top rollers.

The bottom rollers protrude beyond the bottom side 213 of the conveyor belt. When contacted by a drive mechanism, such as an underlying bearing surface, for example, the outer periphery 218 of an actuating roller 220 or a carryway pan or wear strips, mounted in a conveyor frame, the bottom rollers ride in rotation along the bearing surface as the conveyor belt advances. When the conveyor belt advances in the direction of belt travel 216, the bottom rollers 204 rotate in a first direction 222 perpendicular to its axis of rotation. Contact between the bottom rollers and the top rollers causes the top rollers to rotate in an opposite second direction 223 also perpendicular to its axis of rotation 214, but with a rearward component of motion relative to the direction of belt travel 216, which pushes conveyed objects supported on the top rollers rearward along the top side 212 of the conveyor belt.

As best shown in FIG. 13, each cavity 206, which extends through the thickness of the conveyor belt 200 between its top and bottom sides, is hexagonal in shape as defined by a cylindrical wall 224 having a hexagonal cross section. The bottom roller 204 is mounted in a hexagonal frame 226, such as a ring that encircles the axial ends of the bottom roller and supports the ends of the roller's axle. The outside dimensions of the hexagonal ring are just less than the hexagonal dimensions of the cavity so that the ring fits loosely enough in the cavity to be able to slide along the cavity guided by the walls toward and away from the top roller 202, but without so much slop that the ring can rotate within the cavity and change the direction of rotation of the bottom roller. Thus, the hexagonal shape of the outer surface of the ring 226 forms keying structure on the ring and the hexagonal construction of the walls provides them with complementary keying structure that maintains the direction of rotation of the bottom roller while allowing it to float along the cavity toward and away from the top roller. Clearly, other polygonal or non-circular shapes would also provide the keying structure necessary to prevent rotation of the ring.

The height of the cavity wall 224 exceeds the height of the ring 226 to provide the ring and the bottom roller 204 a range of vertical travel along the cavity. When the bottom rollers are riding on underlying bearing surfaces 218, the bearing surfaces, in addition to causing the bottom rollers to rotate in the first direction 222, push them upward against the top rollers 202, causing them to rotate in the opposite second direction 223. So, as the top and bottom rollers wear, the floating bottom roller is inherently pushed upward by the bearing surface into frictional contact against the top roller greater distances to compensate for the diminishing roller diameters. When the rollers are new, the bottom roller sits lower in the cavity when contacting the top roller than when the rollers are worn. Where the bearing surfaces do not engage the bottom rollers along the conveyor carryway, worn bottom rollers drop under the influence of gravity out of contact with the top rollers to a bottommost position in the cavity.

Figure 14:
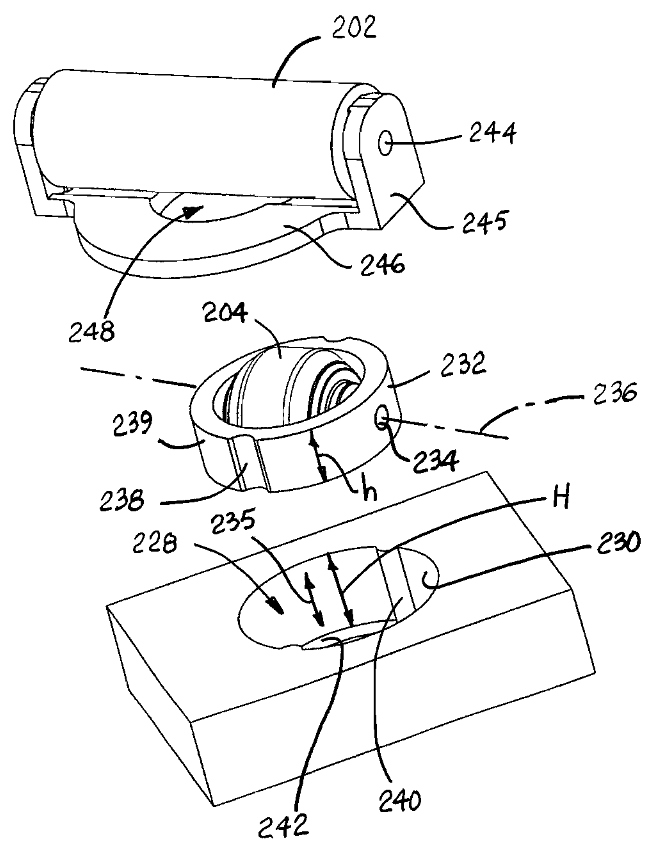
FIG. 14 is an exploded view of a portion of another embodiment of a conveyor belt having a floating bottom roller.

The exploded view of another embodiment of a roller set is shown in FIG. 14. In this example, a circular cavity 228 is bounded by a generally circular cylindrical wall 230. A mating circular ring 232 supports and encircles the bottom roller 204. Opposite ends of an axle 234 are held by the ring. The axle extends through a bore in the roller. The height H of the wall is greater than the height h of the ring to provide the ring a range of vertical motion 235 along the cavity. To prevent the circular ring from rotating in the cavity and changing the orientation of the bottom roller's axis of rotation 236, keying structure in the form of grooves 238 in ring's outer surface 239 cooperate with keying structure in the form of mating pair of vertical ribs 240 formed on the cylindrical wall at diametrically opposite positions. A lip 242 at the bottom end of the cavity restricts the opening of the cavity onto the bottom side of the conveyor belt and serves as retaining structure to prevent the ring from exiting the cavity. A similar lip is formed at the bottom end of each cavity in the conveyor belt of FIGS. 12 and 13. The top roller 202 is mounted on an axle 244 whose ends are held in ears 245 upstanding from a base 246 that is welded or otherwise attached to the top side of the belt. The base forms a cover that retains the ring at the top end of the cavity and has a central hole 248 through which a salient portion of the bottom roller extends into rolling contact with the top roller. As in the roller set of FIGS. 12 and 13, the ring in FIG. 14 can float in the cavity to a position necessary to compensate for roller wear without losing proper orientation.

While particular embodiments have been disclosed in detail in the foregoing description and drawings for purposes of example, it will be understood by those skilled in the art that variations and modifications thereof can be made without departing from the scope of the disclosure.

What is claimed is:

1. A conveyor belt comprising:

a top side and an opposite bottom side;

multiple roller sets, each roller set including a top roller protruding outward of the top side and a bottom roller below the top roller, the bottom roller being movable into contact with the top roller such that driving of one of the rollers in a first direction causes rotation of the other roller in an opposite second direction;

multiple cavities opening onto the top and bottom sides and bounded by a wall extending through the conveyor belt between the top and bottom sides, each cavity housing one of the bottom rollers;

a frame supporting each one of the bottom rollers rotatably within one of the cavities, wherein the frame is slidable along the wall of the cavity toward and away from the top roller.

2. A conveyor belt as in claim 1 wherein the bottom roller is arranged to move out of contact with the top roller by gravity.

3. A conveyor belt as in claim 1 further comprising a drive mechanism wherein the bottom roller is arranged to move into contact with the top roller by contact with the drive mechanism driving the bottom roller at the bottom side of the conveyor belt.

4. A conveyor belt as in claim 1 comprising multiple cavities opening onto the top and bottom sides, each cavity housing one of the bottom rollers, wherein the bottom roller is movable along the cavity between the top and bottom sides.

5. A conveyor belt as in claim 1 further comprising keying structure on the frame and keying structure on the wall, wherein the keying structure on the frame cooperates with the keying structure on the wall to maintain the direction of rotation of the bottom roller.

6. A conveyor belt as in claim 5 wherein the keying structure on the frame comprises grooves on the frame and wherein the keying structure on the wall comprises ribs received in the grooves.

7. A conveyor belt as in claim 5 wherein the frame has a non-circular outer surface forming the keying structure and wherein the keying structure of the wall is formed by the wall's being non-circular and shaped to match the shape of the outer surface of the frame.

8. A conveyor belt as in claim 1 further comprising a retention structure in each cavity retaining the frame and the bottom roller in the cavity.

9. A conveyor belt as in claim 8 wherein the retention structure comprises a lip along the wall of the cavity at the bottom side of the conveyor belt.

10. A conveyor belt as in claim 1 wherein the cavities are cylindrical and the frame is a ring encircling the bottom roller and having outer dimensions slightly less than the inner dimensions of the cavities.

11. A conveyor belt as in claim 10 wherein the cavities are circular and the outer dimensions of the ring are circular.

12. A conveyor belt as in claim 10 wherein the cavities are polygonal and the outer dimensions of the ring are polygonal.

13. A conveyor comprising:

a conveyor belt including:

a top side and an opposite bottom side;

a plurality of cavities extending through the conveyor belt from the top side to the bottom side;

a plurality of roller sets, each roller set including a top roller protruding outward of the top side and a bottom roller movably received in the cavity;

a roller frame rotatably supporting each of the bottom rollers, the roller frame and the bottom roller being slidable along the cavity toward and away from the top roller;

a drive mechanism underlying the conveyor belt and contacting the bottom roller from below to cause the bottom roller to rotate in a first direction and to push the bottom roller against the top roller and rotate the top roller in an opposite second direction.

14. A conveyor as in claim 13 wherein the roller frame is a ring encircling the bottom roller and the cavity is bounded by a wall guiding the ring moving along the cavity.

15. A conveyor as in claim 13 wherein the drive mechanism includes a bearing surface at the bottom side of the conveyor belt on which the bottom rollers roll as the conveyor belt advances.

16. A conveyor belt module comprising:

one or more cavities extending through the thickness of the module;

a plurality of sets of first and second rollers, each first roller received in one of the cavities and having a first axis of rotation and each second roller being affixed to the belt module over the cavity and having a second axis of rotation parallel to the first axis of rotation;

a plurality of rings, each rotatably supporting and encircling one of the first rollers;

wherein each of the first rollers, along with its ring, is slidable along the cavity into and out of contact with the second roller so that, when the first and second rollers are in contact, rotation of the first roller on the first axis in a first direction causes the second roller to rotate on the second axis in an opposite second direction.

17. A conveyor belt module as in claim 16 further comprising a cylindrical wall bounding each of the cavities and providing a guide for the ring sliding along the cavity toward and away from the second roller.

18. A conveyor belt module as in claim 16 further comprising retention structure at the end of the cavity opposite the second roller to confine the ring to the cavity.

* * * * *